UNITED STATES PATENT OFFICE.

JOHN FETZER, OF ROLLA, MISSOURI.

IMPROVEMENT IN PAINT COMPOSITIONS.

Specification forming part of Letters Patent No. 190,301, dated May 1, 1877; application filed March 20, 1877.

*To all whom it may concern:*

Be it known that I, JOHN FETZER, of Rolla, county of Phelps, State of Missouri, have invented a new and useful composition of matter adapted to the purpose of a fire and water proof paint, of which the following is a specification:

To enable others not skilled to prepare this composition of matter, I will describe the method of compounding the ingredients and the proportions used, though I do not wish to be restricted to the proportions named, but claim the right to modify said proportions according to the nature of the material to which the paint is to be applied, and according to the purpose for which it is applied, whether as a fire or water proof surface to the material to be painted.

Take from five to six parts, by weight, of gum-shellac, and from ten to twelve parts of crystallized carbonate of soda, or its chemical equivalent, and dissolve, by the aid of heat, in sixty parts of water. A second solution is made by dissolving, also by the aid of heat, one hundred parts of ordinary alum, fifteen or sixteen parts of crystallized borax, fifteen or sixteen parts of glue, and fifteen or sixteen parts of gum-tragacanth in nine hundred parts of water, and twenty to twenty-six parts of oil of vitriol of the strength known as 66° Baumé are added.

The first solution is added, gradually and with constant stirring, (effected in a mortar, or by any mechanical device,) to a thoroughly-incorporated mixture of one hundred and twenty parts of good white clay, free from iron, and previously anhydrated by calcination, sixty parts of plaster-of-paris, fifteen parts of calcined magnesia, and sixty or sixty-five parts of hydrochloric acid, and twenty to twenty-five parts each of linseed and castor oil.

The second solution, prepared as indicated, and in a heated state, is now added to the mixture, also gradually and with constant agitation.

This composition contains about twenty-eight per cent. fire-proof materials, and from three and a half to four per cent. combustibles; two per cent. colloid; the remainder is water; and, when applied at a temperature not below 50° Fahrenheit, and well dried after application, will hold as well as the ordinary oil-paints. It should be preserved from a low or freezing temperature; and this composition may be colored with any substance, coloring matter, pigment, or dye that will impart any desired or desirable color or shade thereof.

Having thus described my invention, I claim as new and desire to secure by Letters Patent—

A paint composition consisting of calcined clay, plaster-of-paris, borax, calcined magnesia, alum, hydrochloric and sulphuric acid, shellac, carbonate of soda, glue, tragacanth gum, linseed and castor oil, and water, in the proportions substantially as herein set forth and described.

JOHN FETZER.

Witnesses:
   W. B. TALLMAN,
   D. BENNETT.